United States Patent
LaVigne et al.

(10) Patent No.: US 11,861,540 B2
(45) Date of Patent: Jan. 2, 2024

(54) NATURAL LANGUAGE PROCESSING PLATFORM FOR AUTOMATED TRAINING AND PERFORMANCE EVALUATION

(71) Applicant: Allstate Insurance Company, Northbrook, IL (US)

(72) Inventors: Michael A. LaVigne, Prospect Heights, IL (US); Ryan Dunn, Grayslake, IL (US); Ben Phillabaum, Lafayette, IN (US)

(73) Assignee: Allstate Insurance Company, Northbrook, IL (US)

(*) Notice: Subject to any disclaimer, the term of this patent is extended or adjusted under 35 U.S.C. 154(b) by 141 days.

(21) Appl. No.: 16/792,535

(22) Filed: Feb. 17, 2020

(65) Prior Publication Data

US 2021/0256452 A1   Aug. 19, 2021

(51) Int. Cl.
| | |
|---|---|
| *G06Q 10/0639* | (2023.01) |
| *G10L 25/51* | (2013.01) |
| *G10L 15/18* | (2013.01) |

(52) U.S. Cl.
CPC . *G06Q 10/06398* (2013.01); *G06Q 10/06393* (2013.01); *G10L 15/18* (2013.01); *G10L 25/51* (2013.01)

(58) Field of Classification Search
CPC ........ G06Q 10/06398; G06Q 10/06393; G10L 15/18; G10L 25/51
See application file for complete search history.

(56) References Cited

U.S. PATENT DOCUMENTS

| | | |
|---|---|---|
| 7,092,888 B1 | 8/2006 | McCarthy et al. |
| 7,203,285 B2 | 4/2007 | Blair |

(Continued)

FOREIGN PATENT DOCUMENTS

| | | |
|---|---|---|
| CN | 109740155 A | 5/2019 |
| CN | 110135879 A | 8/2019 |

OTHER PUBLICATIONS

"Xanvox CRM" IRISIND https://www.irisind.com/avos.html website visited Feb. 17, 2020, pp. 1-6.

(Continued)

*Primary Examiner* — Mehmet Yesildag
*Assistant Examiner* — Ayanna Minor
(74) *Attorney, Agent, or Firm* — Dinsmore & Shohl LLP

(57) ABSTRACT

Aspects of the disclosure relate to computing platforms that utilize improved natural language processing techniques for performance evaluation and training. A computing platform may automatically determine, based on audio transcription files, a model for dynamic performance evaluation and training, which may be dynamically updated as additional audio transcription files are received. The computing platform may receive and analyze an additional audio transcription file using natural language processing and the model, which may result in proficiency scores. Based on the proficiency scores, the computing platform may calculate an overall proficiency score and identify areas for improvement associated with the first individual. Based on the areas for improvement, the computing platform may determine performance feedback tailored to the individual and may send, to a user device associated with the individual, the performance feedback.

20 Claims, 10 Drawing Sheets

(56) References Cited

U.S. PATENT DOCUMENTS

| | | | |
|---|---|---|---|
| 8,321,220 | B1 | 11/2012 | Chotimongkol et al. |
| 8,351,581 | B2 | 1/2013 | Mikan et al. |
| 8,370,155 | B2 | 2/2013 | Byrd et al. |
| 8,396,741 | B2 | 3/2013 | Kannan et al. |
| 8,755,511 | B2 | 6/2014 | Duva et al. |
| 9,015,046 | B2 | 4/2015 | Pereg et al. |
| 9,635,178 | B2 | 4/2017 | Raanani et al. |
| 10,051,122 | B2 | 8/2018 | Raanani et al. |
| 10,375,241 | B2 | 8/2019 | Miller et al. |
| 10,404,859 | B1 | 9/2019 | Hernandez |
| 10,477,009 | B1 | 11/2019 | Nguyen |
| 2004/0098274 | A1 | 5/2004 | Dezonno et al. |
| 2004/0249650 | A1 | 12/2004 | Freedman et al. |
| 2011/0197206 | A1 | 8/2011 | Deshmukh et al. |
| 2012/0072254 | A1 | 3/2012 | McLean et al. |
| 2014/0025376 | A1 | 1/2014 | Wasserblat et al. |
| 2015/0003595 | A1* | 1/2015 | Yaghi ............... H04M 3/5175 379/85 |
| 2016/0343263 | A9* | 11/2016 | Aylesworth ............ G06Q 50/20 |
| 2017/0249650 | A1* | 8/2017 | Olsen ................ G06Q 30/0202 |
| 2017/0323244 | A1* | 11/2017 | Rani ....................... G07C 5/02 |
| 2018/0331842 | A1 | 11/2018 | Faulkner et al. |
| 2019/0245973 | A1 | 8/2019 | Dwyer et al. |
| 2019/0297186 | A1 | 9/2019 | Karani |
| 2021/0027799 | A1* | 1/2021 | Scodary ................ G06F 16/683 |

OTHER PUBLICATIONS

"Perfect your contact center. Explore new ways to wow your customers. One month on us." Ytica WFO & Analytics https://appconnect.talkdesk.com/apps/ytica-wfo-analytics, Jun. 19, 2019, pp. 1-4.

Frank Ohlhorst "Using AI in Natural Language Processing for B2C, Call Centers" eWeek https://www.eweek.com/enterprise-apps/using-ai-in-natural-language-processing-for-b2c-call-centers Mar. 11, 2019, pp. 1-7.

Souraya Ezzat et al. "Sentiment Analysis of Call Centre Audio Converstaions using Text Classification" International Journal of Computer Information Systems and Indutrial Management Aplications ISSN 2150-7988 vol. 4 (2012) http://www.mirlabs.org/ijcisim/regular_papers_2012/Paper68.pdf, pp. 619-627.

May 5, 2021—(WO) International Search Report and Written Opinion—PCT/US21/018126.

* cited by examiner

Manager Dashboard Interface

| Rep. | Close Rate (CR) | Linked Quote % | Benchmark CR | CR v. Benchmark | Ask for Sale | Multiline Offer | Objection Handling | Selling Effort Time | Sales Effectiveness |
|---|---|---|---|---|---|---|---|---|---|
| Rep. #1 | 20% | 35% | 19% | 1% | 40% | 45% | 50% | 125 | 54 |
| Rep. #2 | 15% | 40% | 16% | -1% | 30% | 50% | 40% | 85 | 41 |
| Rep. #3 | 25% | 30% | 28% | -3% | 15% | 40% | 30% | 60 | 29 |
| Rep. #4 | 10% | 50% | 8% | 2% | 55% | 65% | 60% | 160 | 70 |

FIG. 4

Feedback Interface for Rep. 3

It looks like you have a lower close rate than your peers. It looks like asking for the sale more may increase your performance. Perhaps you are struggling with asking for the sale because your sales calls are too short (we've noticed that they are significantly shorter than your peers). Try extending the sales conversation and asking for the sale during this extended time. This may help increase your sales effectiveness. If you would like some examples of successful ways to ask for the sale, proved successful by your peers, please click here.

FIG. 5

NATURAL LANGUAGE PROCESSING PLATFORM FOR AUTOMATED TRAINING AND PERFORMANCE EVALUATION

BACKGROUND

Aspects of the disclosure relate to enhanced processing systems for performing natural language processing. Many organizations and individuals evaluate employee performance to identify strong and/or weak performers, provide training, and drive revenue. In many instances, however, such performance evaluations may be subjective, and may result in generic best practices that are not tailored to the individual. Furthermore, use of such generic evaluations results in technical challenges of identifying, in real time, root causes of performance differences and identifying feedback to improve deficient performance accordingly.

SUMMARY

Aspects of the disclosure provide effective, efficient, scalable, and convenient technical solutions that address and overcome the technical problems associated with performance evaluation and training. In accordance with one or more arrangements discussed herein, a computing platform having at least one processor, a communication interface, and memory may determine, based on one or more of a plurality of audio transcription files, each associated with one of a plurality of individuals, a model for dynamic performance evaluation and training. In these arrangements, the model may be dynamically updated as additional audio transcription files are received. The computing platform may receive an additional audio transcription file associated with a first individual of the plurality of individuals. The computing platform may analyze the additional audio transcription file using natural language processing and the model, which may result in one or more proficiency scores, each corresponding to an event in the additional audio transcription file. Based on the one or more proficiency scores, the computing platform may calculate an overall proficiency score. Based on the one or more proficiency scores, the computing platform may identify one or more areas for improvement associated with the first individual. Based on the one or more areas for improvement, the computing platform may determine performance feedback tailored to the first individual. Using the performance feedback tailored to the first individual, the computing platform may generate a feedback interface and may send, to a user device associated with the first individual, the feedback interface.

In one or more instances, the computing platform may receive, prior to calculating the overall proficiency score, a second plurality of audio transcription files corresponding to the first individual. In these instances, the computing platform may calculate the overall proficiency score by analyzing the second plurality of audio transcription files using natural language processing and the model. In these instances, the one or more proficiency scores may be based, at least in part, on the analysis of the second plurality of audio transcription files.

In one or more examples, the computing platform may analyze the additional audio transcription file and the second plurality of audio transcription files by analyzing one or more of: words spoken by the first individual, a total duration of silence, an average sentence length, or an amount of time the first individual spoke in comparison to a second individual. The computing platform may analyze the one or more of the plurality of audio transcription files, which may result in one or more additional proficiency scores, each corresponding to an event in the one or more of the plurality of audio transcription files. In addition, the computing platform may compare the proficiency scores to the one or more additional proficiency scores to determine a performance comparison between the first individual and the plurality of individuals.

In one or more instances, the computing platform may generate, using the one or more proficiency scores and the overall proficiency score, a manager dashboard interface. The computing platform may send, to a user device associated with a manager of the first individual, the manager dashboard interface.

In one or more arrangements, the computing platform may generate one or more feedback interface commands and one or more manager dashboard interface commands. The computing platform may send, to the user device associated with the first individual, the one or more feedback interface commands, which may cause the user device associated with the first individual to display the feedback interface. The computing platform may send, to the user device associated with the manager of the first individual, the one or more manager dashboard interface commands, which may cause the user device associated with the manager of the first individual to display the manager dashboard interface.

In one or more instances, the manager dashboard interface may include, for each of the first individual and the plurality of individuals, one or more of: a representative identifier, a close rate (CR), a linked quote percentage, a benchmark CR, and a comparison of the CR to the benchmark CR. In one or more instances, the benchmark close rate may indicate an average close rate of individuals who both: are located in a geographic area associated with the first individual, and are associated with a job title associated with the first individual.

In one or more instances, the computing platform may determine an impact on performance caused by the performance feedback tailored to the first individual. Based on the impact on performance, the computing platform may dynamically modify the model for dynamic performance evaluation and training. In one or more instances, the computing platform may generate the feedback interface in real time or near real time.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4-5 depict illustrative user interfaces for automating training and performance evaluation using improved natural language processing techniques in accordance with one or more example arrangements discussed herein.

DETAILED DESCRIPTION

Figure 1A:
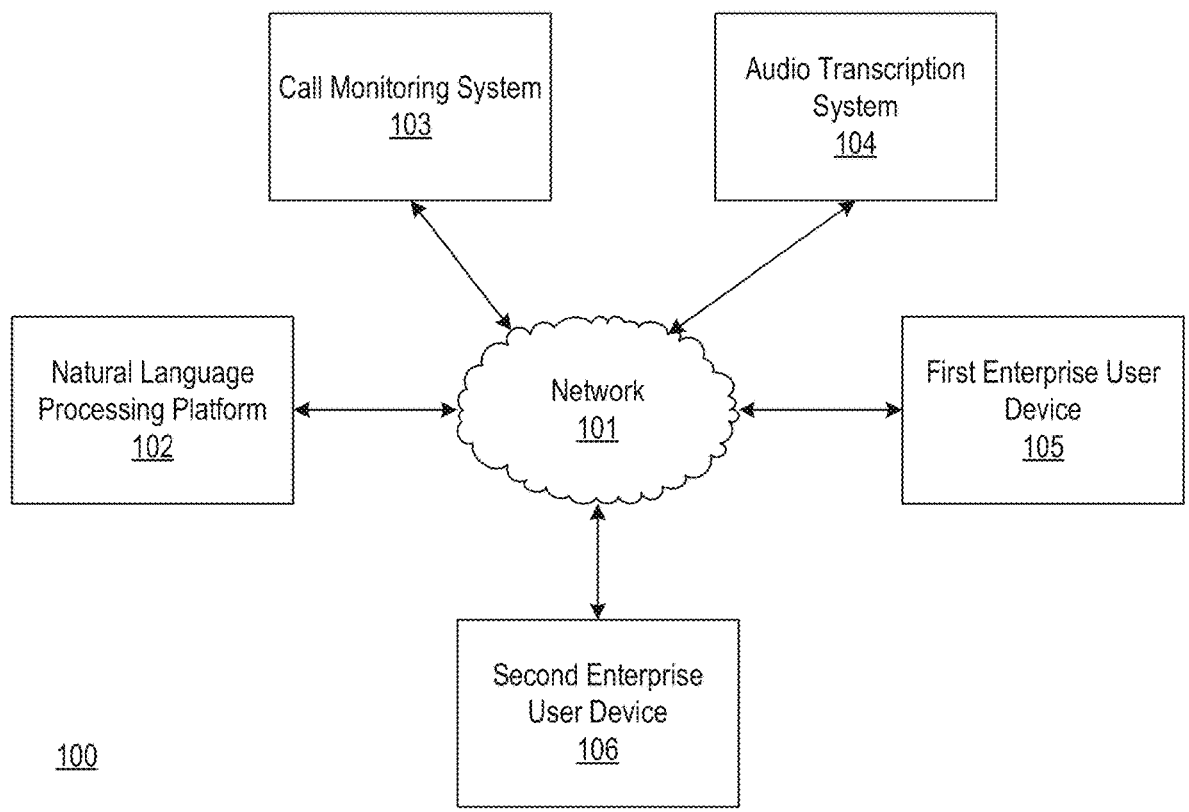
FIGS. 1A-1B depict an illustrative computing environment for automating training and performance evaluation using improved natural language processing techniques in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the present disclosure provides systems and methods for leveraging natural language processing (NLP) techniques to provide automated performance evaluation and training. In short, a computing platform may utilize NLP and modeling techniques to identify and define interaction events with consumers and customers. This may enable the computing platform to diagnose proficiency of producers and effectiveness of their processes when engaging in various customer interactions. In doing so, the systems and methods described herein may improve efficiency and effectiveness of process and interactions between enterprise organizations (e.g., such as insurance organizations) and their consumers and/or customers. Accordingly, the described systems and methods will ultimately drive revenue for the company through increased growth and retention.

More specifically, the computing platform may monitor agency interactions with consumers and customers, and may derive performance measures from call recordings to drive improved consumer and customer interactions. Based on the derived performance measures, the computing platform may generate recommendations in real time (or near real time) to individuals (e.g., agents or producers) to further their ability to adjust their interactions and techniques during the interactions and improve the chance of success (e.g., in closing a sale). The computing platform may analyze structured data to determine differences in performance between individuals (e.g., who is the best at a particular skill). In addition, the computing platform may tag text in unstructured data from audio transcription files to identify what is driving differences in performance between successful and unsuccessful performers. Accordingly, by collecting and analyzing both structured and unstructured data, the computing platform may not only identify top performers, but may also identify what these top performers are doing differently.

By analyzing audio transcript data, the computing platform may identify data related to multiple individuals participating in a call, which may ultimately help to improve performance (e.g., provide insight into how an agent attempted to make a sale and insight into how the target consumer/customer objected). For example, among other things, the computing platform may identify data related to relating and building rapport (e.g., consumer intention or whether an agent and customer found common ground), assessing customer needs (e.g., did agent attempt to discuss assets or how receptive was a consumer to the offer), product recommendations (e.g., did agent suggest broader protection needs and associated coverage for risks), generating tailored quotes (e.g., was a three question quote for homeowners insurance discussed, or what types of objection rebuttals work best), binding and establishing onboarding expectations (e.g., did the agent ask for the sale or just offer to send a proposal, or is this a sale or just fulfilling a consumer ask), or the like.

The computing platform may then utilize this voice data (e.g., from audio transcription files) to identify what actually occurred on a call (e.g., close rates), what is expected to occur (e.g., a benchmark/expected close rate), and what is causing the difference between the actual and expected occurrences (e.g., ask for sale percentage). For example, the computing platform may determine that person #1 has a close rate of 15%, person #2 has a close rate of 20%, and person #3 has a close rate of 25%. The computing platform may output this information to a user device associated with a manager of person #1, person #2, and/or person #3. Accordingly, the manager may determine that person #3 is a high performer, person #2 is an average performer, and person #1 is a poor performer, and similarly, that the manager needs to coach person #1 and person #2 to be more like person #3. Additionally or alternatively, the computing platform may determine that person #1 is 3% above an associated benchmark close rate of 12%, a second person is 1% above an associated benchmark close rate (19%), and person #3 is 2% below an associated benchmark close rate (27%). The computing platform may output this information to the user device associated with the manager of person #1, person #2, and/or person #3. Accordingly, the manager may determine that person #1 is a high performer, person #2 is average, and person #3 is a poor performer, and similarly that he or she needs to coach person #2 and person #3 to be more like person #1. Additionally or alternatively, the computing platform may determine that person #1 asks for the sale 75% of the time, person #2 asks for the sale 50% of the time, and person #3 asks for the sale 25% of the time. The computing platform may output this information to the user device associated with the manager of person #1, person #2, and/or person #3. Accordingly, the manager may determine that person #1 is a high performer and often asks for the sale, person #2 is an average performer and sometimes asks for the sale, and person #3 is a poor performer and rarely asks for the sale, and similarly that he or she may improve the performance of person #2 and person #3 by coaching them to ask for the sale more frequently.

In doing so, the computing platform may go beyond the calculation of traditional staff level metrics such as close rate, linked quote, quotes, production, or the like that provide minimal context to good or bad or what is driving performance. The computing platform may provide emerging metrics such as agency level close rate benchmark, agency level 92 day retention, or the like, which may provide context to what should have happened (e.g., indicating whether a call was successful or unsuccessful, but not why). To address the deficiencies of these traditional staff level metrics and emerging metrics, the computing platform may determine staff level benchmarks that provide finer and more granular details at a staff level for detailed troubleshooting on whether the associated individual is a good or bad performer. Furthermore, the computing platform may derive voice metrics for each staff member to enable tailored recommendations informed by observation and analysis of calls reducing need for generic best practices.

Accordingly, by extracting such detailed and granular metrics associated with conversations, the computing platform may not only identify whether an individual (e.g., an insurance agent) is a high, average, or low performer, but may identify what actions, performed by the individual, are leading to the success and/or failure. In some instances, the computing platform may identify that an individual is successful in certain areas but not others. Accordingly, rather than merely identifying that the individual needs to improve his or her performance, the computing platform may offer specific guidance to the individuals, based on what has been successful for other individuals, in order to improve overall performance and to give managers a more detailed scorecard of their employees' performance and/or improve their coaching. Accordingly, this may result in improved efficiency and effectiveness of process and interactions between individuals (e.g., agents and customers), and may drive sales revenue through increased growth and retention.

Furthermore, this may provide insight to agency owners and staff with respect to the sales process. In doing so, agency owners may have more transparency into how their staff are performing and provide tailored coaching accordingly. For example, some organizations (e.g., insurance companies), may have many different local offices and processes, with only one or two employees at each (e.g., insurance sales agents). Furthermore, these organizations may experience high turnover rates. In these instances, it may be difficult for local branch owners to evaluate performance of their local employees. For example, a local insurance branch may have a manager and six employees. The manager may be able to identify one of the employees as being deficient in following through on sales at high prices. Using one or more of the systems and methods described herein, the manager may be able to leverage data associated with the organization as a whole to compare the deficient employee to others across the organization (e.g., not merely the local branch) and to identify ways to improve performance based on techniques used across the organization from other employees who have been successful in areas where the identified employee is deficient (e.g., in following through on sales at high prices).

Figure 1B:
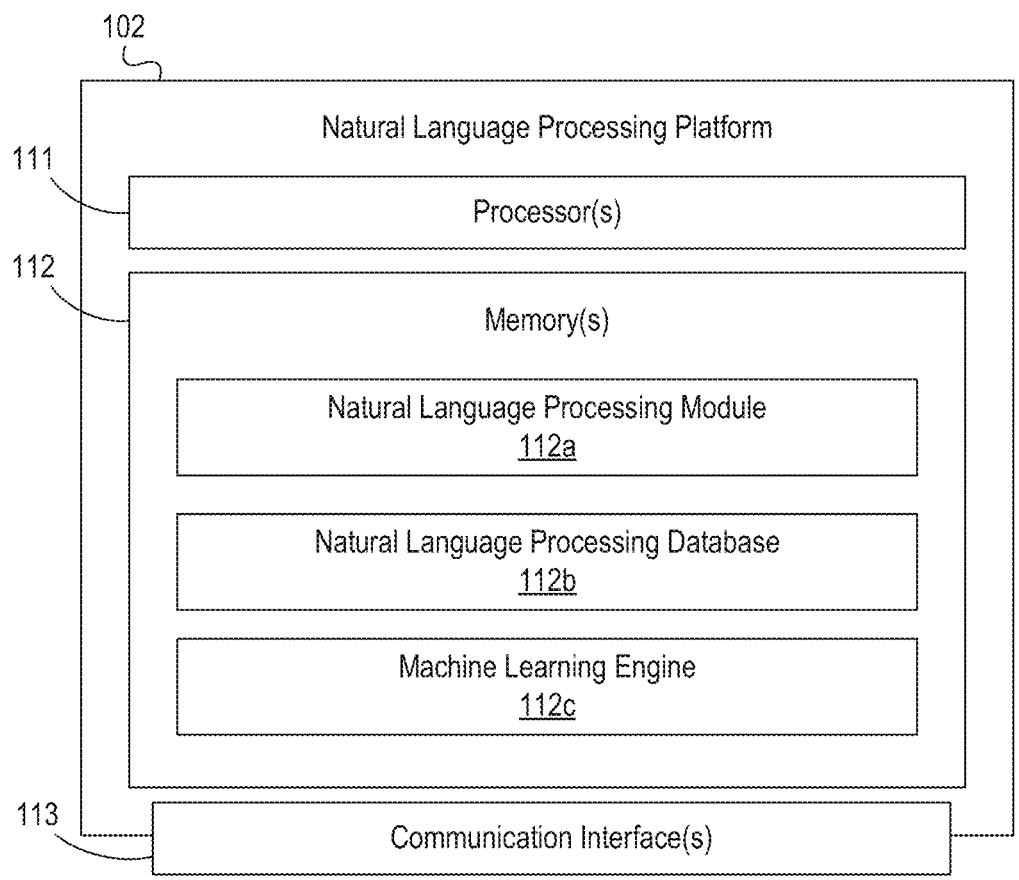

FIGS. 1A and 1B depict an illustrative computing environment for automated training and performance evaluation using improved natural language processing techniques in accordance with one or more example embodiments. Referring to FIG. 1A, computing environment 100 may include one or more computer systems. For example, computing environment 100 may include natural language processing platform 102, claim monitoring system 103, audio transcription system 104, first enterprise user device 105, and second enterprise user device 106.

As illustrated in greater detail below, natural language processing platform 102 may include one or more computing devices configured to perform one or more of the functions described herein. For example, natural language processing platform 102 may include one or more computers (e.g., laptop computers, desktop computers, servers, or server blades). In one or more instances, natural language processing platform 102 may be configured to perform natural language processing techniques in audio transcript file analysis to identify one or more events (e.g., ask for the sale, multiline offer, objection handling, or selling effort time) and/or evaluate performance based on the audio transcript files. Additionally, the natural language processing platform 102 may maintain a model for dynamic performance evaluation and training that may be used by the natural language processing platform 102 to analyze the audio transcript files and may be dynamically updated by the natural language processing platform 102 as additional audio transcript files and/or performance data are received. In one or more instances, the natural language processing platform 102 may be associated with an organization or entity (e.g., an insurance agency, or the like).

Call monitoring system 103 may be a computing device configured to monitor and record (e.g., with appropriate permissions) calls (telephonic, video, voice over internet protocol, or the like) for further analysis. In one or more instances, call monitoring system 103 may be configured with one or more microphones to enable recording capabilities. In some instances, call monitoring system 103 may be a computing device (e.g., server or server blade) that is configured to record and transmit such recordings to another computing device (e.g., natural language processing platform 102). In one or more instances, the call monitoring system 103 may comprise a single computing device. In other instances, the call monitoring system 103 may comprise multiple devices. In one or more instances, the call monitoring system 103 may be associated with an organization or entity (e.g., an insurance agency).

Audio transcription system 104 may be a computing system configured to receive audio files and transcribe them into text files. In some instances, the audio transcription system 104 may be maintained by the same company or organization associated with the natural language processing platform 102. In other instances, the audio transcription system 104 may be maintained by a different company or organization than that associated with the natural language processing platform 102. For example, the audio transcription system 104 may be maintained and operated by a third party transcription vendor. In one or more instances, the audio transcription system 104 may be a computing device configured with transcription and word processing capabilities. In these instances, the audio transcription system 104 may be a laptop computer, desktop computer, tablet computer, smartphone, server, server blade, or the like.

First enterprise user device 105 may be a computing device (e.g., a desktop computer, laptop computer, tablet computer, or smart phone) that may be used (e.g., by a representative of an organization such as an insurance company) to perform sales activities (e.g., sale of home insurance or vehicle insurance). It should be understood that first enterprise user device 105 is not necessarily usable exclusively by a representative of an insurance company. Rather, first enterprise user device 105 may be a user device configured for use by a variety of users. In one or more instances, the first enterprise user device 105 may be a computing device configured to receive information (e.g., from the natural language processing platform 102) and to generate/display graphical user interfaces (e.g., performance feedback interfaces) accordingly.

Second enterprise user device 106 may be a computing device (e.g., a desktop computer, laptop computer, tablet computer, or smart phone) that may be used (e.g., by a manager of an organization such as an insurance company) to manage and/or otherwise oversee sales representatives and/or activities (e.g., sale of home insurance or vehicle insurance). It should be understood that second enterprise user device 106 is not necessarily usable exclusively by a manager of an insurance company. Rather, second enterprise user device 106 may be a user device configured for use by a variety of users. In one or more instances, the second enterprise user device 106 may be a computing device configured to receive information (e.g., from the natural language processing platform 102) and to generate/display graphical user interfaces (e.g., manager dashboard interfaces) accordingly. It should be understood that although the application describes first enterprise user device 105 and second enterprise user device 106, which are operated by an individual and that individual's manager respectively, it should be understood that any number of enterprise user devices may be used (e.g., by agents or managers) to perform the methods described herein.

Computing environment 100 also may include one or more networks, which may interconnect one or more of natural language processing platform 102, call monitoring system 103, audio transcription system 104, first enterprise user device 105, second enterprise user device 106, or the like. For example, computing environment 100 may include a network 101 (which may, e.g., interconnect natural language processing platform 102, call monitoring system 103, audio transcription system 104, first enterprise user device 105, and/or second enterprise user device 106).

In one or more arrangements, natural language processing platform 102, call monitoring system 103, audio transcription system 104, first enterprise user device 105, second enterprise user device 106, and/or the other systems included in computing environment 100 may be any type of computing device capable of and configured for receiving a user interface, receiving input using the user interface, and communicating the received input to one or more other computing devices. For example, natural language processing platform 102, call monitoring system 103, audio transcription system 104, first enterprise user device 105, second enterprise user device 106, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of natural language processing platform 102, call monitoring system 103, audio transcription system 104, first enterprise user device 105, and second enterprise user device 106 may, in some instances, be special-purpose computing devices configured to perform specific functions.

Referring to FIG. 1B, natural language processing platform 102 may include one or more processors 111, memory 112, and communication interface 113. A data bus may interconnect processor 111, memory 112, and communication interface 113. Communication interface 113 may be a network interface configured to support communication between natural language processing platform 102 and one or more networks (e.g., network 101). Memory 112 may include one or more program modules having instructions that when executed by processor 111 cause natural language processing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of natural language processing platform 102 and/or by different computing devices that may form and/or otherwise make up natural language processing platform 102. For example, memory 112 may have, store, and/or include natural language processing module 112a, a natural language processing database 112b, and a machine learning engine 112c. Natural language processing platform 102 may have instructions that direct and/or cause natural language processing platform 102 to execute advanced natural language claim processing techniques, as discussed in greater detail below. Natural language processing database 112b may store information used by natural language processing module 112a and/or natural language processing platform 102 in transcription analysis, evaluating performance, providing performance feedback, and/or in performing other functions. Machine learning engine 112c may have instructions that direct and/or cause the natural language processing platform 102 to perform transcription analysis, evaluate performance, provide performance feedback, and to set, define, and/or iteratively refine optimization rules and/or other parameters used by the natural language processing platform 102 and/or other systems in computing environment 100.

Figure 2A:
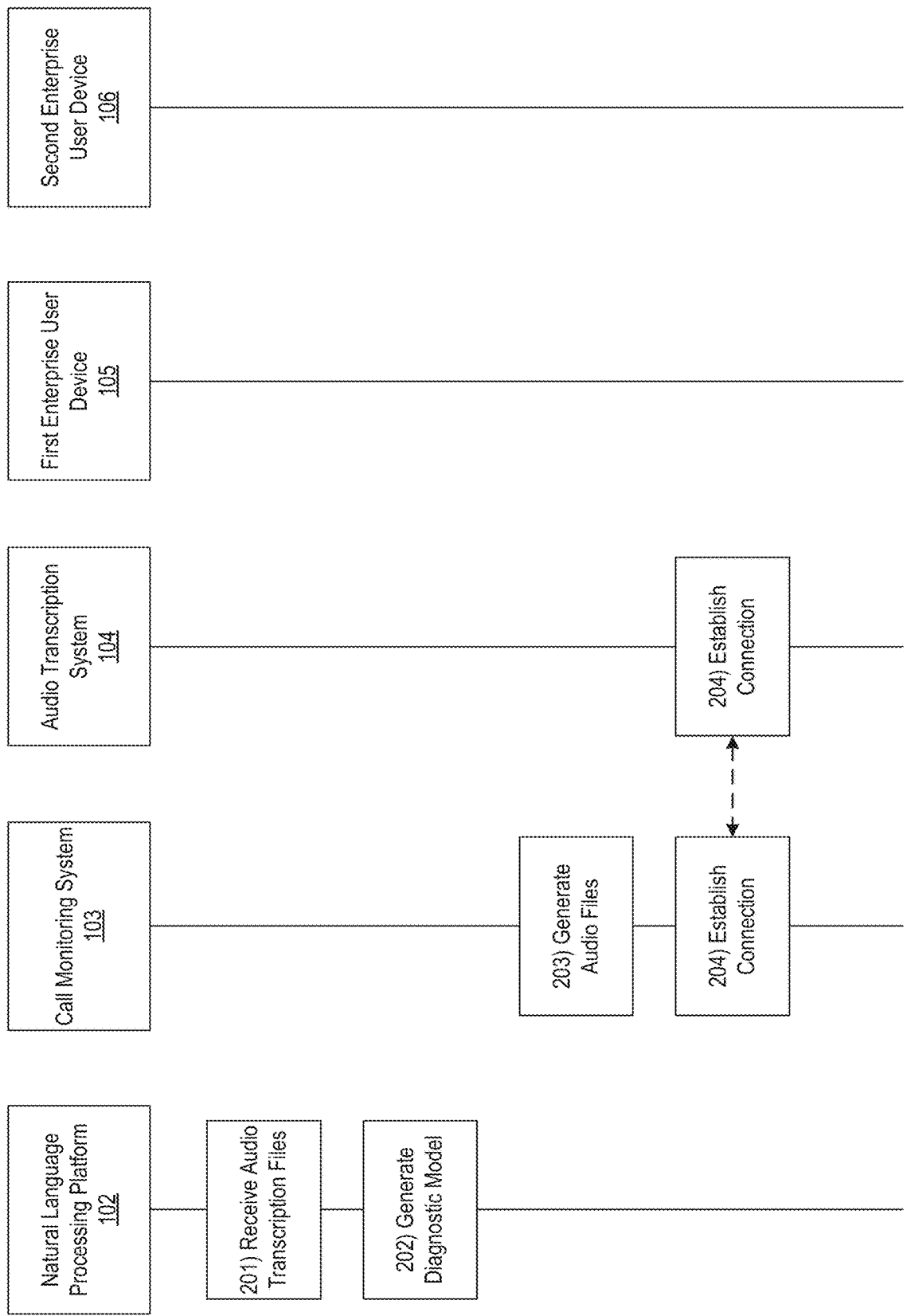
FIGS. 2A-2F depict an illustrative event sequence for automating training and performance evaluation using improved natural language processing techniques in accordance with one or more example arrangements discussed herein.

FIGS. 2A-2F depict an illustrative event sequence for providing enhanced and optimized performance evaluation and training using improved natural language processing techniques in accordance with one or more example embodiments. Referring to FIG. 2A, at step 201, the natural language processing platform 102 may receive one or more audio transcription files. In some instances, the natural language processing platform 102 may receive the audio transcription files from an audio transcription system (e.g., audio transcription system 104). In some instances, in receiving the one or more audio transcription files, the natural language processing platform 102 may receive audio transcription files associated with a plurality of individuals (e.g., insurance agents or customers) and the audio transcription files may correspond to a particular type of audio (e.g., recordings of insurance sales calls). In one or more instances, the natural language processing platform 102 may receive the audio transcription files via the communication interface 113.

At step 202, the natural language processing platform 102 may automatically generate an interaction proficiency diagnostic model based on the one or more audio transcription files received at step 201. For example, the natural language processing platform 102 may apply natural language processing techniques to identify features in the one or more audio transcription files indicative of one or more performance events (e.g., asking for the sale, multiline offering, sales objection, closing a sale, or phrases used) and/or additional metrics associated with the one or more audio transcription files (e.g., selling effort time, amount of time speaking by each participant on a call, or duration of silence). In some instances, the natural language processing platform 102 may identify whether or not a sale was executed in each audio transcription file, and may tag performance events and/or additional metrics associated with the respective audio transcription file as successful or unsuccessful accordingly (e.g., successful if a sale was executed, or unsuccessful if a sale was not executed). In some instances, the natural language processing platform 102 may identify that a subset of the one or more performance events and/or additional metrics in a particular audio transcription file should be tagged as successful even though a sale was not ultimately executed (e.g., an agent had the sale wrapped up based on applied techniques but then was unable to complete the sale at the very end) and/or should be tagged as unsuccessful event though a sale was ultimately executed (e.g., an agent saved the sale with later applied techniques). Accordingly, the natural language processing platform 102 may generate a natural language processing model that may be able to identify successful and unsuccessful aspects of the audio transcription files for purposes of providing performance feedback and evaluation.

At step 203, the call monitoring system 103 may generate one or more additional audio files (e.g., generated once the interaction proficiency diagnostic model described at step 202 has been trained). For example, in generating the one or more additional audio files, the call monitoring system 103 may record a conversation (e.g., between a customer and an agent) over one of a plurality of mediums (e.g., telephone, voice over internet protocol, or video conference). In these instances, the call monitoring system 103 may receive a permission indication from a user device and may record the calls based on receipt of the permission indication. In generating the one or more additional audio files, the call monitoring system 103 may generate an audio file corresponding to a conversation between a customer and an agent regarding an insurance claim. In some instances, the call monitoring system 103 may generate the one or more additional audio files in real time (e.g., during a conversation between an agent and a customer). Additionally or alternatively, the call monitoring system 103 may generate the one or more additional audio files after the fact (e.g., upon conclusion of the conversation between the agent and the customer). In generating the additional audio files, the call monitoring system 103 may generate a plurality of audio files each corresponding to a conversation between various customers and a common agent (e.g., a collection of a particular agent's conversations).

At step 204, the call monitoring system 103 may establish a connection with the audio transcription system 104. In some instances, the call monitoring system 103 may establish a first wireless data connection with the audio transcription system 104 to link the call monitoring system 103 to the audio transcription system 104. In these instances, the call monitoring system 103 may identify whether a connection is already established with the audio transcription system 104. If a connection is already established, the call monitoring system 103 might not reestablish the first wireless data connection. If, however, the call monitoring system 103 does not already have an established connection with the audio transcription system 104, the call monitoring system 103 may establish the first wireless data connection as described herein.

Figure 2B:
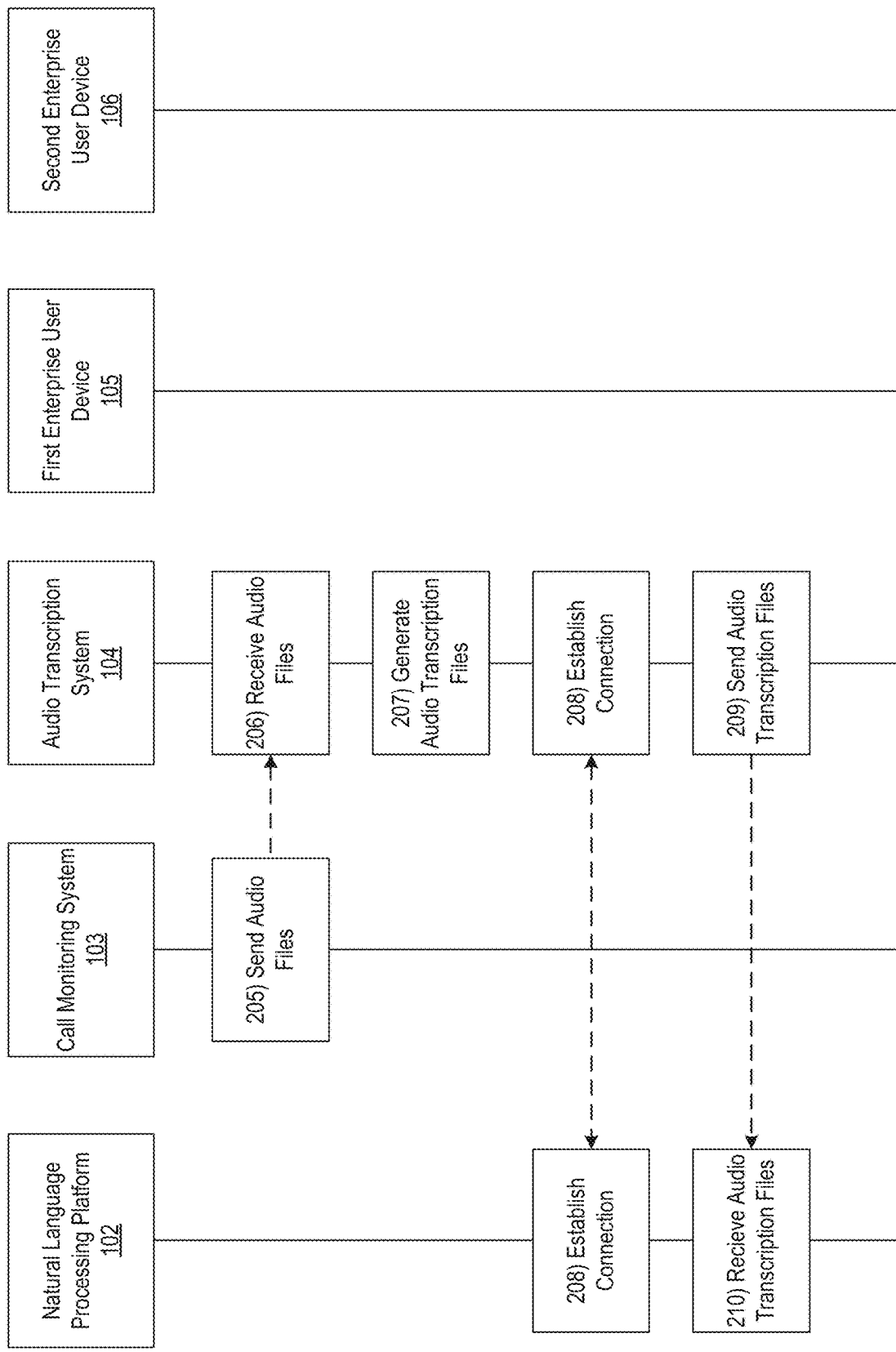

Referring to FIG. 2B, at step 205, the call monitoring system 103 may send, share, or otherwise provide the one or more additional audio files, generated at step 203, to the audio transcription system 104. In one or more instances, the audio transcription system 104 may send the one or more additional audio files to the natural language processing platform 102 while the first wireless data connection is established. In some instances, the call monitoring system 103 may send each of the one or more additional audio files as they are generated. In other instances, the call monitoring system 103 may send the one or more additional audio files in batches and/or all together.

At step 206, audio transcription system 104 may receive or otherwise access the one or more additional audio files sent at step 206. In one or more instances, the audio transcription system 104 may receive the one or more additional audio files while the first wireless data connection is established. In one or more instances, rather than receiving merely an audio file, the natural language claim processing platform 102 may receive a video file (e.g., from a video conference) and may separate the audio file from the video file.

At step 207, the audio transcription system 104 may generate an audio transcription file for each of the one or more additional audio files received at step 206. At step 208, the audio transcription system 104 may establish a connection with natural language processing platform 102. For example, the audio transcription system 104 may establish a second wireless data connection with the natural language processing platform 102 to link the audio transcription system 104 to the natural language processing platform 102.

In some instances, the audio transcription system 104 may determine whether a connection is already established with the natural language processing platform 102. If a connection is already established with the natural language processing platform 102, the audio transcription system 104 might not reestablish the second wireless data connection. If a connection is not already established with the natural language processing platform 102, the audio transcription system 104 may establish the second wireless data connection as described herein.

At step 209, the audio transcription system 104 may send, share, or otherwise provide the audio transcription files, generated at step 207, to the natural language processing platform 102. In one or more instances, the audio transcription system 104 may send the audio transcription files to the natural language processing platform 102 while the second wireless data connection is established. In some instances, the audio transcription system 104 may send the audio transcription files in real time as they are generated. In other instances, the audio transcription system 104 may send the audio transcription files in batches (e.g., based on a predetermined/configurable period of time or number of files).

At step 210, the natural language processing platform 102 may receive, or otherwise access, the audio transcription files sent at step 209. In receiving the audio transcription files, the natural language processing platform 102 may receive the audio transcription files via the communication interface and while the second wireless data connection is established.

Figure 2C:
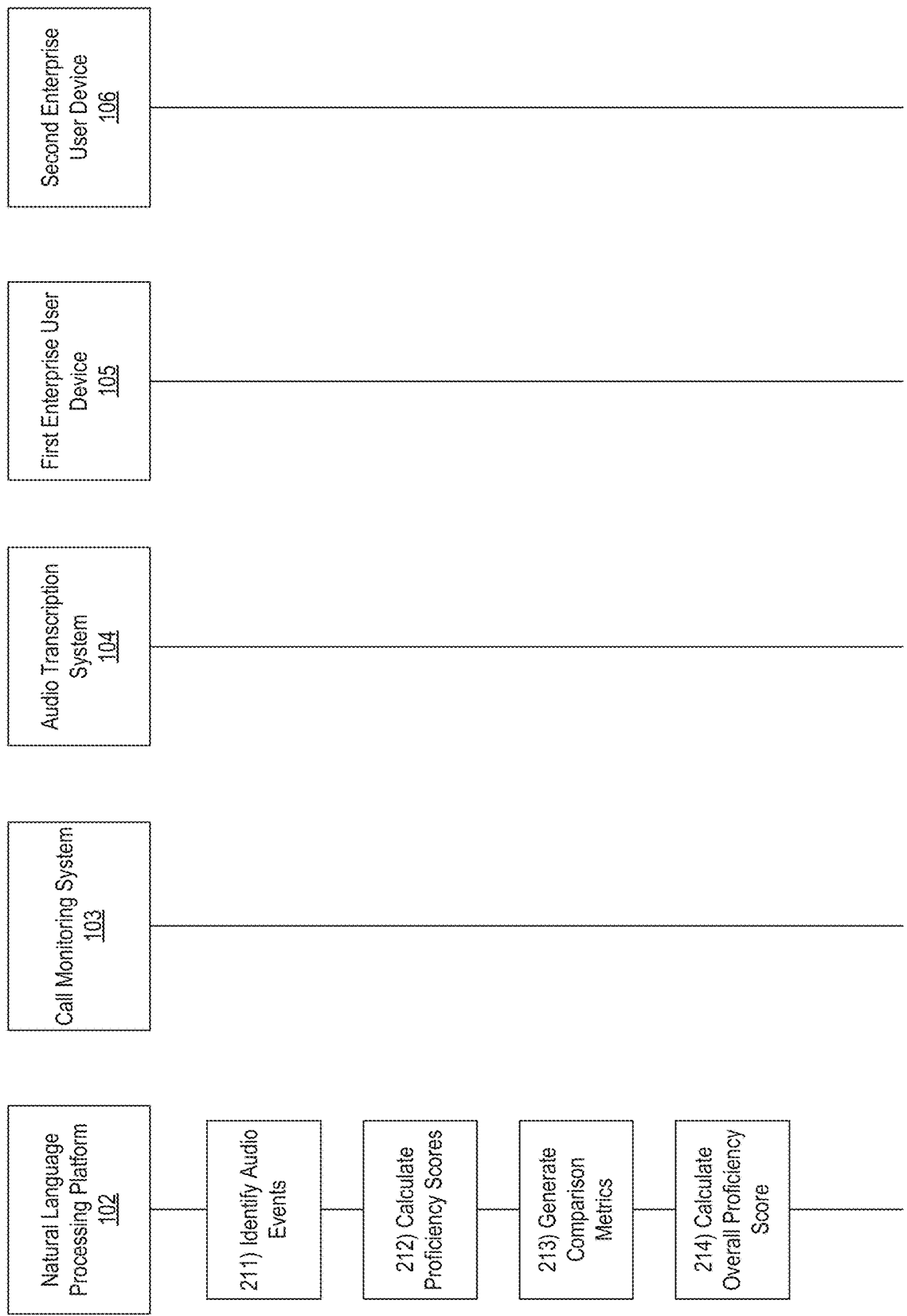

Referring to FIG. 2C, at step 211, the natural language processing platform 102 may identify one or more audio events in the audio transcription files. For example, the natural language processing platform 102 may analyze the audio transcription files using the interaction proficiency diagnostic model to identify language in the audio transcription files consistent with asking for the sale, making a multiline offer, handling an objection, or the like.

In some instances, the natural language processing platform 102 may process each of the audio transcription files sequentially. Alternatively, the natural language processing platform 102 may process the audio transcription files simultaneously.

At step 212, once the natural language processing platform 102 has completed identifying the one or more audio events in the audio transcription files, the natural language processing platform 102 may group the events by event type and may calculate a proficiency score for each event type. For example, the natural language processing platform 102 may identify that, at step 211, a first individual (e.g., an agent) asked customers to complete a sale in eight audio transcription files associated with the first individual, but not in a remaining twelve audio transcription files. Accordingly, in this example, the natural language processing platform 102 may calculate that the first individual has an "ask for the sale" proficiency score of 40%. Additionally or alternatively, the natural language processing platform 102 may identify that a second individual (e.g., another agent) asked customers to complete a sale in three audio transcription files associated with the second individual, but not in a remaining seven audio transcription files. Accordingly, in this example, the natural language processing platform 102 may calculate that the second individual has an "ask for the sale" proficiency score of 30%.

As another example, the natural language processing platform 102 may identify, at step 211, that the first individual made a multiline offer to customers in nine of the audio transcription files associated with the first individual (e.g., which may or might not include the eight audio transcription files in which the first individual asked for the sale), but not in a remaining eleven audio transcription files. Accordingly, the natural language processing platform 102 may calculate a "multiline offer" score of 45%.

As yet another example, the natural language processing platform 102 may identify, at step 211, that customers objected to offers made by the first individual in four of the eight audio transcription files in which the first individual asked customers to complete a sale. In this example, the natural language processing platform 102 may determine that regardless of the objections, the first individual was successful in completing a sale in two of these four identified audio transcription files. Accordingly, the natural language processing platform 102 may calculate an "objection handling" proficiency score for the first individual of 50%.

In some instances, the natural language processing platform 102 may calculate additional metrics associated with the audio transcript files, such as average speaking ratios (e.g., how long one individual is speaking in comparison to another), average duration of silence, average sentence length, average selling effort time, or the like. For example, the natural language processing platform 102 may determine (e.g., based on timestamps in the audio transcription files) that the first individual has an average call length of 125 minutes. In some instances, the natural language processing platform 102 may use these additional metrics as proficiency scores.

In some instances, the natural language processing platform 102 may calculate individual proficiency scores and/or metrics for each audio transcription file, and may combine (e.g., average) the proficiency scores and/or metrics to calculate proficiency scores for each event type and/or metric (e.g., a single score for each of: ask for the sale, multiline offer, objection handling, selling effort time, close rate, or the like associated with a particular individual (e.g., an agent)). In some instances, the natural language processing platform 102 may determine whether proficiency scores and/or metrics have been calculated for each individual associated with one of the audio transcript files received at step 210. If additional individuals remain, the natural language processing platform 102 may return to step 211 to identify audio events associated with a subsequent remaining individual (e.g., to calculate proficiency scores for each of a plurality of agents at an insurance company). If proficiency scores have been calculated for each individual, the natural language processing platform 102 may continue to step 213.

At step 213, the natural language processing platform 102 may apply the interaction proficiency diagnostic model to the proficiency scores and/or metrics calculated at step 212 to generate comparison metrics. In some instances, based on the audio transcription files received at step 201 that were used to train the interaction proficiency diagnostic model, the natural language processing platform 102 may calculate benchmark proficiency scores and/or metrics (e.g., an average value representative of agents in a particular region, practice, job title, or the like). In some instances, the natural language processing platform 102 may calculate the benchmark proficiency scores and/or metrics for groups defined using multiple factors. For example, the natural language processing platform 102 may calculate a benchmark close rate by calculating an average close rate of individuals who are both located in a particular geographic region and have a particular job title.

In some instances, the natural language processing platform 102 may have identified, at step 212, that a first individual had a close rate proficiency score of 20% (e.g., the first individual closed a sale on 20% of his or her calls) and that a second individual had a close rate proficiency score of 25% (e.g., the second individual closed a sale on 25% of his or her calls). In this example, it would appear that the second individual is a better salesperson. In some instances, however, the natural language processing platform 102 may identify that a benchmark close rate associated with the first individual is 19% and that a benchmark close rate associated with the second individual is 28% (e.g., because the second individual is selling in a better market, for example). Accordingly, when compared to the benchmark, the first individual is actually 1% higher and the second individual is 3% lower than their respective benchmark close rates. Thus, although the natural language processing platform 102 may calculate a higher close rate for the second individual, the natural language processing platform 102 may identify the first individual as a better performer in context. By generating such comparison metrics, the natural language processing platform 102 may add further detail to the proficiency scores and/or metrics calculated at step 212 by showing how each individual compares against each other and against the benchmark values.

In one or more instances, the natural language processing platform 102 may dynamically adjust the benchmark values as audio transcription files are processed. For example, if a particular geographic region is associated with a benchmark close rate of 20%, and the natural language processing platform 102 calculates, based on subsequent audio transcription files, that a plurality of individuals associated with the particular geographic region have raised their individual close rates to 40%, the natural language processing platform 102 may adjust the benchmark close rate to reflect this increase in performance (e.g., by raising the benchmark close rate). In some instances, the natural language processing platform 102 may dynamically and continually adjust the benchmark values so that they reflect an average value for individuals in a group associated with the given benchmark values.

At step 214, the natural language processing platform 102 may calculate an overall proficiency score for each identified individual (e.g., using the interaction proficiency diagnostic model and based on the proficiency scores and metrics calculated at steps 212 and 213). In some instances, in calculating the overall proficiency score, the natural language processing platform 102 may compute an average or weighted average of the proficiency scores and metrics calculated at steps 212 and 213. For example, in one instance, the natural language processing platform 102 may have calculated an "ask for sale" proficiency score of 40%, a "multiline offer" proficiency score of 45%, and an "objection handling" score of 50% for a first individual. In this example, the natural language processing platform 102 may calculate an average of these three scores, thus resulting in an overall proficiency score (e.g., a sales effectiveness score) of 45. In yet another example, for the first individual, the natural language processing platform 102 may have calculated a close rate of 20%, a linked quote proficiency score of 35%, a benchmark close rate of 19%, an "ask for the sale" proficiency score of 40%, a "multiline offer" proficiency score of 45%, an "objection handling" score of 50%, and a selling effort duration of 125 minutes for the first individual. In this example, the natural language processing platform 102 may feed this data into the interaction proficiency diagnostic model, which may compute (e.g., by applying various weights, as determined by the natural language processing platform 102, to the various pieces of data) an overall proficiency score of 54.

In some instances, the natural language processing platform 102 may assign different weights to different data in the overall proficiency score calculation for different groups (e.g., by region, job title, or the like). For example, the natural language processing platform 102 may apply more weight to selling effort time in a first geographic region (e.g., a region where a language barrier often causes increased call length) than in a second geographic region (e.g., a region without a language barrier). In these instances, the natural language processing platform 102 may dynamically adjust the weights based on recognized trends (e.g., disappearance of the language barrier described above may result in the natural language processing platform 102 reducing the weight applied to selling effort time in the overall proficiency score calculation).

In one or more instances, prior to calculating the overall proficiency score, the natural language processing platform 102 may return to step 211 to identify audio events in another audio transcription file, received at step 210. In these instances, the natural language processing platform 102 might not calculate the overall proficiency score until all of the audio transcription files, associated with the respective individual, have been analyzed. In one or more instances, the natural language processing platform 102 may perform steps 211-214 automatically without receiving a user input. In other instances, the natural language processing platform 102 may perform steps 211-214 in response to receiving a user input requesting that such steps be performed (e.g., from an enterprise user device).

Figure 2D:
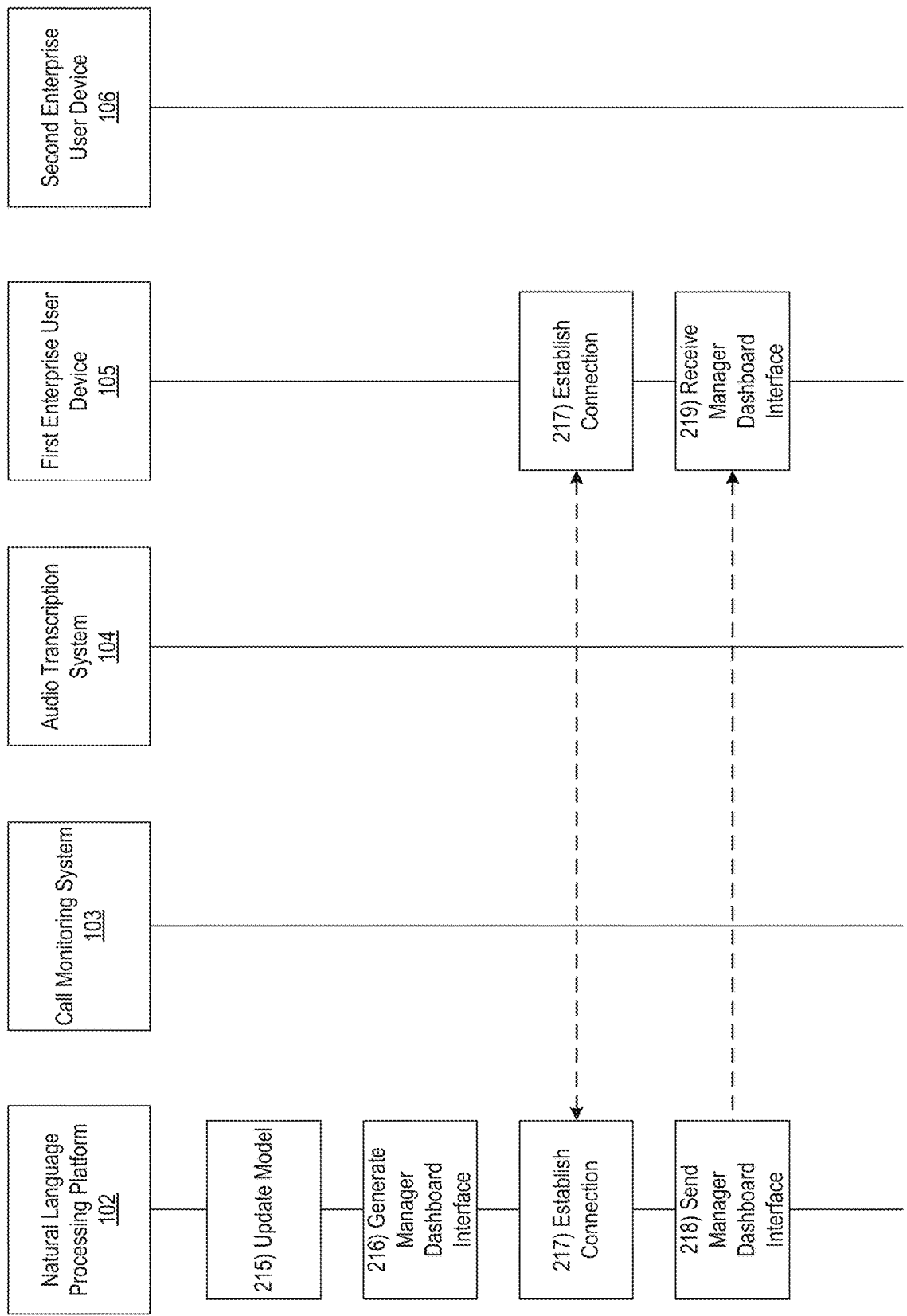

Referring to FIG. 2D, at step 215, the natural language processing platform 102 may dynamically update the interaction proficiency diagnostic model based on the audio transcription files received at step 210 and the subsequent analysis of such audio transcription files. For example, the natural language processing platform 102 may update benchmark values, weight values, or the like as described above at step 214. Additionally or alternatively, the interaction proficiency diagnostic model may iteratively refine one or more machine learning datasets used by the interaction proficiency diagnostic model to analyze the audio transcription files. As an example, a particular phrase used by an agent in a particular circumstance may have been previously successful in handling an objection, but the natural language processing platform 102 may determine that the particular phrase is no longer associated with positive sales results. Accordingly, in this example, the natural language processing platform 102 may modify the interaction proficiency diagnostic model to recognize this particular phrase and to no longer classify the particular phrase as a successful objection handling technique.

In some instances, in updating the interaction proficiency diagnostic model, the natural language processing platform 102 may identify whether events identified in the audio transcription files at step 211 had an effect on close rate. For example, the natural language processing platform 102 may determine whether or not asking for the sale (and the "ask for the sale" proficiency score) has an effect on close rate. If the natural language processing platform 102 determines that a particular event does not have an effect on close rate, it may update the interaction proficiency diagnostic model so that the particular event is not analyzed in further audio transcription files (e.g., to conserve processing power and/or computing resources). If the natural language processing platform 102 determines that the particular event does have an effect on close rate, it may reinforce the interaction proficiency diagnostic model so the particular event continues to be analyzed in future audio transcription files. In doing so, the natural language processing platform 102 may engage in an iterative process of building events, analyzing the effect of the events on close rates, and tuning the events accordingly. This may allow the natural language processing platform 102 to determine events that are actually useful, valuable, or the like in comparison to those that are not. If the natural language processing platform 102 determines that an event is not valuable, it may determine that the event is not worth conveying (e.g., via a manager dashboard interface or feedback interface).

At step 216, the natural language processing platform 102 may generate a manager dashboard interface based on the proficiency scores and metrics calculated in steps 212-214. In generating the manager dashboard interface, the natural language processing platform 102 may compile the proficiency scores and metrics calculated in steps 212-214 into a single dashboard, which may comprise one or more pages. For example, the natural language processing platform 102 may generate an interface containing, for each identified individual, a representative identifier, a close rate, a linked quote percentage, a benchmark close rate, a difference between the close rate and the benchmark close rate, an "ask for the sale" score, a "multiline offer" score, an "objection handling" score, a selling effort time duration, an overall sales effectiveness score, or the like. Accordingly, by generating such a manager dashboard interface, the natural language processing platform 102 may use voice metrics to determine why an individual is achieving their corresponding level of performance (e.g., instead of merely identifying that the individual is a poor performer without additional context). In doing so, the natural language processing platform 102 may identify what is driving the corresponding performance and how to improve it if necessary.

In some instances, the natural language processing platform 102 may generate one or more commands directing an enterprise user device (e.g., first enterprise user device 105 or second enterprise user device 106) to display the manager dashboard interface. In some instances, rather than generating the manager dashboard interface itself, the natural language processing platform 102 may generate manager dashboard interface information that may be used by an enterprise user device (e.g., first enterprise user device 105 or second enterprise user device 106) to generate the manager dashboard interface.

At step 217, the natural language processing platform 102 may establish a connection with the first enterprise user device 105. In some instances, the natural language processing platform 102 may establish a third wireless data connection with the first enterprise user device 105 to link the natural language processing platform 102 to the first enterprise user device 105. In some instances, the natural language processing platform 102 may identify whether or not a connection is already established with the first enterprise user device 105. If a connection is already established with the first enterprise user device 105, the natural language processing platform 102 might not reestablish the connection. If a connection is not already established with the first enterprise user device 105, the natural language processing platform 102 may establish the third wireless data connection as described herein.

At step 218, the natural language processing platform 102 may send the manager dashboard interface (or manager dashboard interface information) and the one or more commands directing the first enterprise user device 105 to display the manager dashboard interface. In some instances, the natural language processing platform 102 may send the manager dashboard interface and the one or more commands directing the first enterprise user device 105 to display the manager dashboard interface via the communication interface 113 while the third wireless data connection is established.

At step 219, the first enterprise user device 105 may receive the manager dashboard interface (or manager dashboard interface information) and one or more commands directing the first enterprise user device 105 to display the manager dashboard interface. In some instances, the first enterprise user device 105 may receive the manager dashboard interface and the one or more commands directing the first enterprise user device 105 to display the manager dashboard interface while the third wireless data connection is established.

Figure 2E:
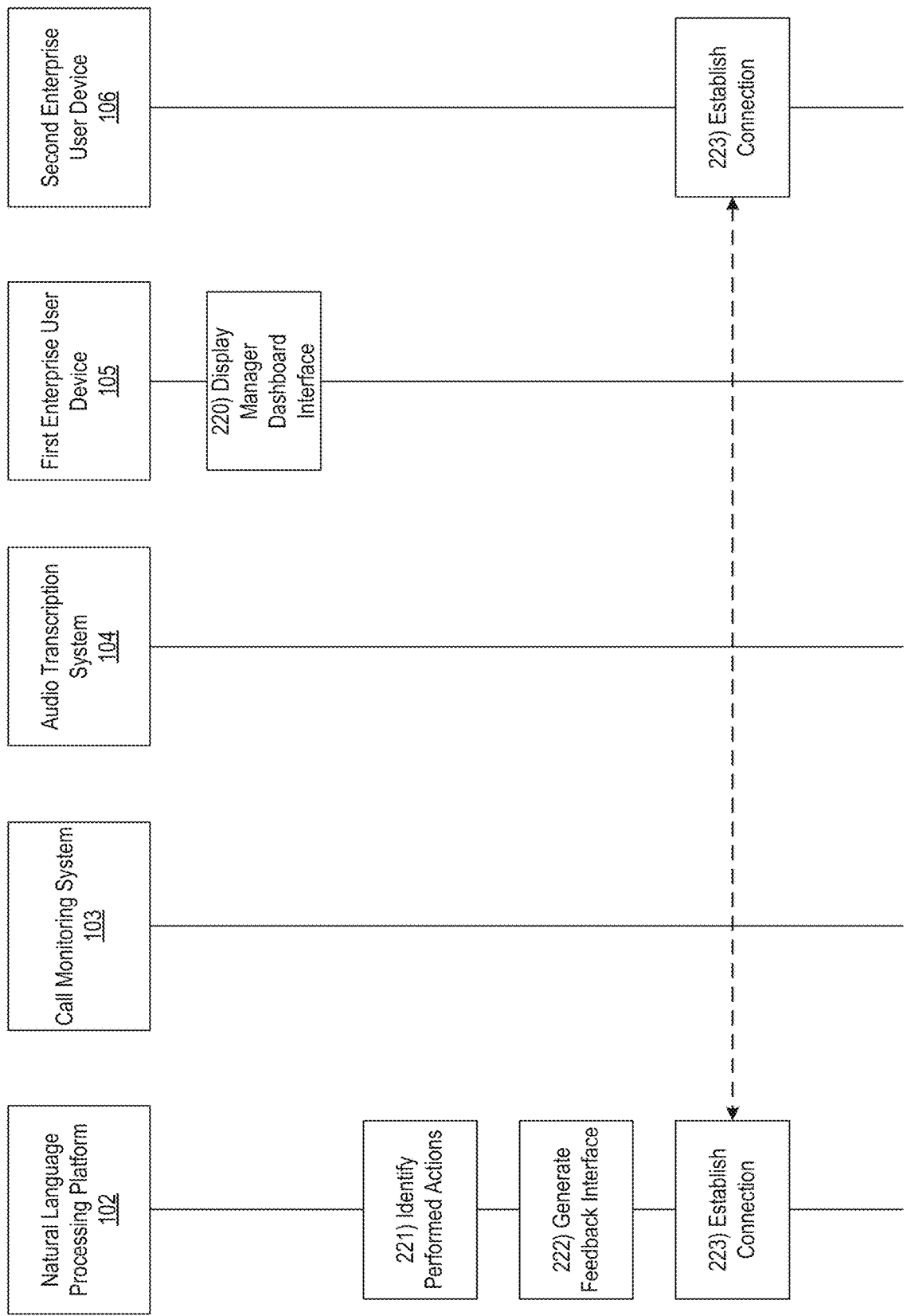

Referring to FIG. 2E, at step 220, the first enterprise user device 105 may display the manager dashboard interface in response to the one or more commands directing the first enterprise user device 105 to display the manager dashboard interface received at step 219. In some instances, in displaying the manager dashboard interface, the first enterprise user device 105 may display a graphical user interface similar to graphical user interface 405, which is shown in FIG. 4. For example, the first enterprise user device 105 may display metrics, proficiency scores, or the like, calculated by the natural language processing platform 102 for a plurality of individuals (e.g., sales representatives at an insurance company). In some instances, in displaying the manager dashboard interface, the first enterprise user device 105 may display a dashboard that may navigate to one or more different interfaces in response to receiving a user input.

At step 221, the natural language processing platform 102 may identify, for each individual and using the interaction proficiency diagnostic model, one or more successful and/or unsuccessful tactics applied in their associated audio transcription files. For example, the natural language processing platform 102 may identify one or more ways an individual asked for a sale, proposed a multiline offer, handled a customer objection, or the like. Additionally or alternatively, the natural language processing platform 102 may identify a ratio of how much the individual spoke in comparison to how much a customer spoke, average sentence length, duration of silence, selling effort time, or the like.

At step 222, based on the tactics identified at step 221 and/or the proficiency scores and/or metrics calculated at steps 212-214, the natural language processing platform 102 may generate a feedback interface. In generating the feedback interface, the natural language processing platform 102 may automatically identify, based on the proficiency scores, one or more areas for improvement, and may automatically determine, based on the one or more areas for improvement, performance feedback tailored to a target recipient of the feedback interface. In generating the feedback interface, the natural language processing platform 102 may generate an interface that displays one or more successful and/or unsuccessful tactics applied by an individual (e.g., an agent for whom the feedback interface is intended), successful tactics applied by other individuals, and/or other recommendations to improve performance of the individual (e.g., with regard to improving their close rate during insurance sales calls or the like). For example, there may be multiple ways for an agent to ask for a sale based on analysis of audio transcription files from a plurality of agents, and the natural language processing platform 102 may generate an interface that indicates the most effective way based on comparison of close rates between agents and the techniques employed by the most effective agents.

In generating the feedback interface, the natural language processing platform 102 may identify a type of feedback that may be most advantageous to an individual (e.g., what feedback is most valuable to the agent) and may generate the feedback interface based on this identified type of feedback. For example, the natural language processing platform 102 may determine that, based on the proficiency scores and/or metrics calculated in steps 212-214, providing feedback to the agent related to improving an "ask for the sale" performance of the agent may be more valuable than providing feedback to the agent related to improving the agent's "multiline offer" performance (see e.g., representative #3 who, as shown in FIG. 4, has a low "ask for the sale" proficiency score but a high "multiline offer" score). In some instances, the natural language processing platform 102 may additionally identify value at even a more granular level. For example, after determining that feedback should be related towards asking for the sale, the natural language processing platform 102 may identify specific areas for improvement related to asking for the sale, determine the value of each, and generate the feedback interface to include one or more types of feedback based on the corresponding values. For example, the natural language processing platform 102 may identify that an agent is using language to ask for the sale that is typically effective (e.g., as determined by performance of other agents across the organization), but is asking too early in a call and thus is not effective in closing a sale. Accordingly, the natural language processing platform 102 may determine that providing feedback related to such timing is more valuable than providing feedback related to specific phrases to use in asking for the sale, and may include such timing feedback in the feedback interface. It should be understood that in a similar manner, the natural language processing platform 102 may continue to identify value associated with increasingly granular performance data, and in doing so, may identify feedback that is specifically tailored to various individuals so as to maximize each of their performances.

In some instances, in generating the feedback interface, the natural language processing platform 102 may identify specific examples in which the individual did or did not apply effective techniques (e.g., techniques shown to improve close rates). Additionally or alternatively, in generating the feedback interface, the natural language processing platform 102 may identify specific examples in which another individual within the organization did or did not apply effective techniques (e.g., techniques shown to improve close rates). In these instances, the natural language processing platform 102 may generate the feedback interface so as to include these examples.

In some instances, the natural language processing platform 102 may also identify, using one or more machine learning algorithms, a most effective method for providing training and/or feedback to the individual, and may generate the feedback interface accordingly. For example, the natural language processing platform 102 may identify whether the individual is an audio learner, visual learner, hands on learner, or the like, and may generate the feedback interface accordingly so as to deliver the feedback and/or training in a method that may be most effective in improving performance of the feedback recipient.

In some instances, the natural language processing platform 102 may generate one or more commands directing the second enterprise user device 106 to display the feedback interface. In some instances, the natural language processing platform 102 may generate feedback interface information, rather than the feedback interface itself, that may be used to generate the feedback interface.

In one or more instances, the natural language processing platform 102 may perform steps 221 and 222 automatically without receiving user input requesting that they be performed. In other instances, the natural language processing platform 102 may perform steps 221 and 222 in response to receiving a user input (e.g., from an enterprise user device, or the like) requesting that they be performed. It should be understood that any of the methods described at step 222 with regard to generation of the feedback interface may be applied by the natural language processing platform 102 in generation of the manager dashboard interface at step 216.

At step 223, the natural language processing platform 102 may establish a connection with the second enterprise user device 106. In some instances, the natural language processing platform 102 may establish a fourth wireless data connection with the second enterprise user device 106. In some instances, the natural language processing platform 102 identify whether or not a connection is already established with the second enterprise user device 106. If a connection is already established with the second enterprise user device 106, the natural language processing platform 102 might not reestablish the fourth wireless data connection. If a connection is not already established, the natural language processing platform 102 may establish the fourth wireless data connection as described herein.

Figure 2F:
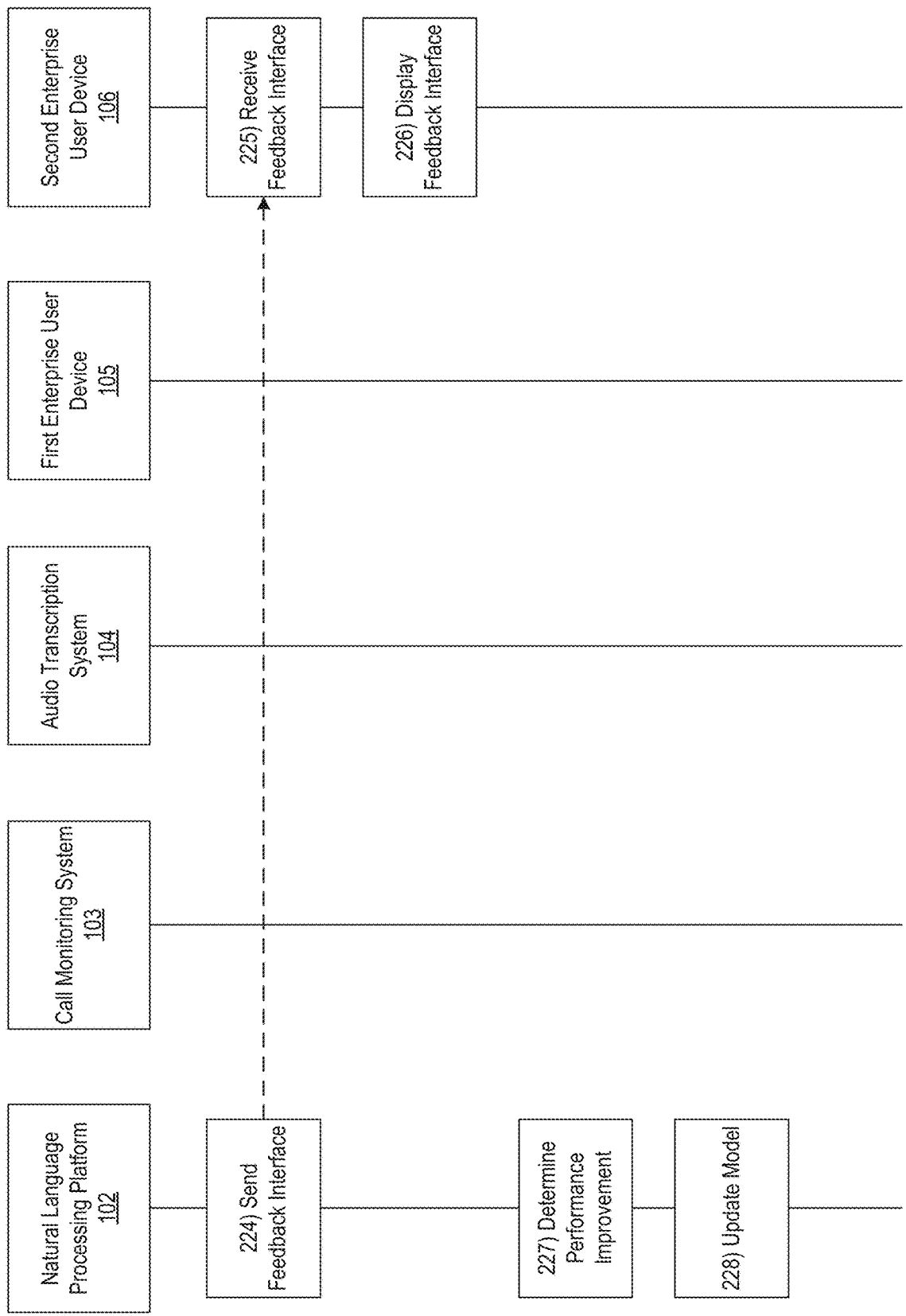

Referring to FIG. 2F, at step 224, the natural language processing platform 102 may send the feedback interface (or feedback interface information) and one or more commands directing the second enterprise user device 106 to display the feedback interface. In some instances, the natural language processing platform 102 may send the feedback interface and one or more commands directing the second enterprise user device 106 to display the feedback interface via the communication interface 113 while the fourth wireless data connection is established.

At step 225, the second enterprise user device 106 may receive the feedback interface (or feedback interface information) and the one or more commands directing the second enterprise user device 106 to display the feedback interface. In one or more instances, the second enterprise user device 106 may receive the feedback interface and the one or more commands directing the second enterprise user device 106 to display the feedback interface while the fourth wireless data connection is established.

At step 226, the second enterprise user device 106 may display the feedback interface in response to the one or more commands directing the second enterprise user device 106 to display the feedback interface. In some instances, in displaying the feedback interface, the second enterprise user device 106 may display a graphical user interface similar to graphical user interface 505, which is shown in FIG. 5. For example, the second enterprise user device 106 may display feedback to improve performance of an individual viewing the graphical user interface 505 (e.g., specific techniques or phrases that the individual should use to increase his or her close rate). In some instances, such feedback may be identified by the interaction proficiency diagnostic model at step 222. In some instances, the second enterprise user device 106 may display the feedback interface in real time (e.g., a call may be transcribed and analyzed in real time so feedback may be provided to an agent in real time). In some instances, the second enterprise user device 106 may display an interface prompting an individual to ask for a credit card number, account number, or the like.

At step 227, the natural language processing platform 102 may determine whether or not a performance improvement occurred for an individual associated with the second enterprise user device 106 in response to the feedback displayed at step 226. For example, the natural language processing platform 102 may identify whether or not additional audio transcript files, received after the feedback interface was displayed, indicate that the individual modified their techniques based on the feedback. Similarly, the natural language processing platform 102 may identify whether or not the individual's close rate improved as a result of the modified techniques.

At step 228, the natural language processing platform 102 may update the interaction proficiency diagnostic model based on the determination at step 227 of whether the feedback provided at step 226 improved performance. If the natural language processing platform 102 determines that the close rate increased, the natural language processing platform 102 may reinforce the interaction proficiency diagnostic model to emphasize that the recommended techniques remain successful. If the natural language processing platform 102 determines that the close rate decreased, the natural language processing platform 102 may adjust the model to reflect that the recommended techniques did not improve success (and/or that they reduced success). In these instances, if the natural language processing platform 102 determines that a proposed technique decreases a number of close rates that exceeds a predetermined threshold, the natural language processing platform 102 may determine that the proposed technique should no longer be supplied as feedback to improve performance.

Subsequently the event sequence may end. Accordingly, one or more aspects of the systems and methods described herein may be used to address technical difficulties associated with performance improvement and training. By incorporating natural language processing, the process of analyzing performance and providing corresponding feedback may be increasingly automated, thus conserving time traditionally spent in manual performance evaluation. Furthermore, more in depth analysis may be performed and ultimately used to diagnose performance proficiency with increased accuracy, and ultimately to provide more effective tailored training (after the fact and/or in real time) to individuals accordingly.

Individuals (such as insurance agents or the like) may make many calls (sales calls, or the like). By recording, transcribing, and analyzing the transcripts associated with these calls, computing platforms may automatically tap into each individual's strengths and weaknesses, and may boost sales by leveraging this information to guide the individuals accordingly (e.g., in real time, after the fact, or both). By performing this analysis across a plurality of individuals associated with an organization (e.g., an insurance organization), the systems described herein may alleviate strain on managers who may be managing a high employee turnover rate in, for example, a remote branch office, and may be unable to adequately assess strengths and weaknesses of such employees. For example, the systems may identify strengths and weaknesses of individuals (e.g., independently or in comparison to their peers), and may automatically provide feedback and/or training accordingly to improve performance. By computing baseline metrics across an organization and within subsets of the organization (e.g., based on region or job title), the systems described herein may have further reference data for assessing individual performance. Furthermore, by automatically providing such feedback, the systems described herein may reduce an amount of time spent by managers manually reviewing performance data and providing live feedback. In addition, by assessing transcripts to identify techniques used by individuals at a granular level, the systems described herein may not only provide tailored, non-generic performance feedback, but may automatically identify value associated with the feedback and in doing so, may provide the most valuable feedback available and efficiently and effectively improve performance. Then, by dynamically maintaining and adjusting the interaction proficiency diagnostic model, the systems described herein may continually modify their understanding of best and most effective practices so as to potentially improve performance.

It should be understood that the steps described in the illustrative event sequence may be performed in any order without departing from the scope of the disclosure. Furthermore, it should be understood that any of the steps described in the illustrative event sequence above may be performed automatically, without being requested by a user input.

Figure 3:
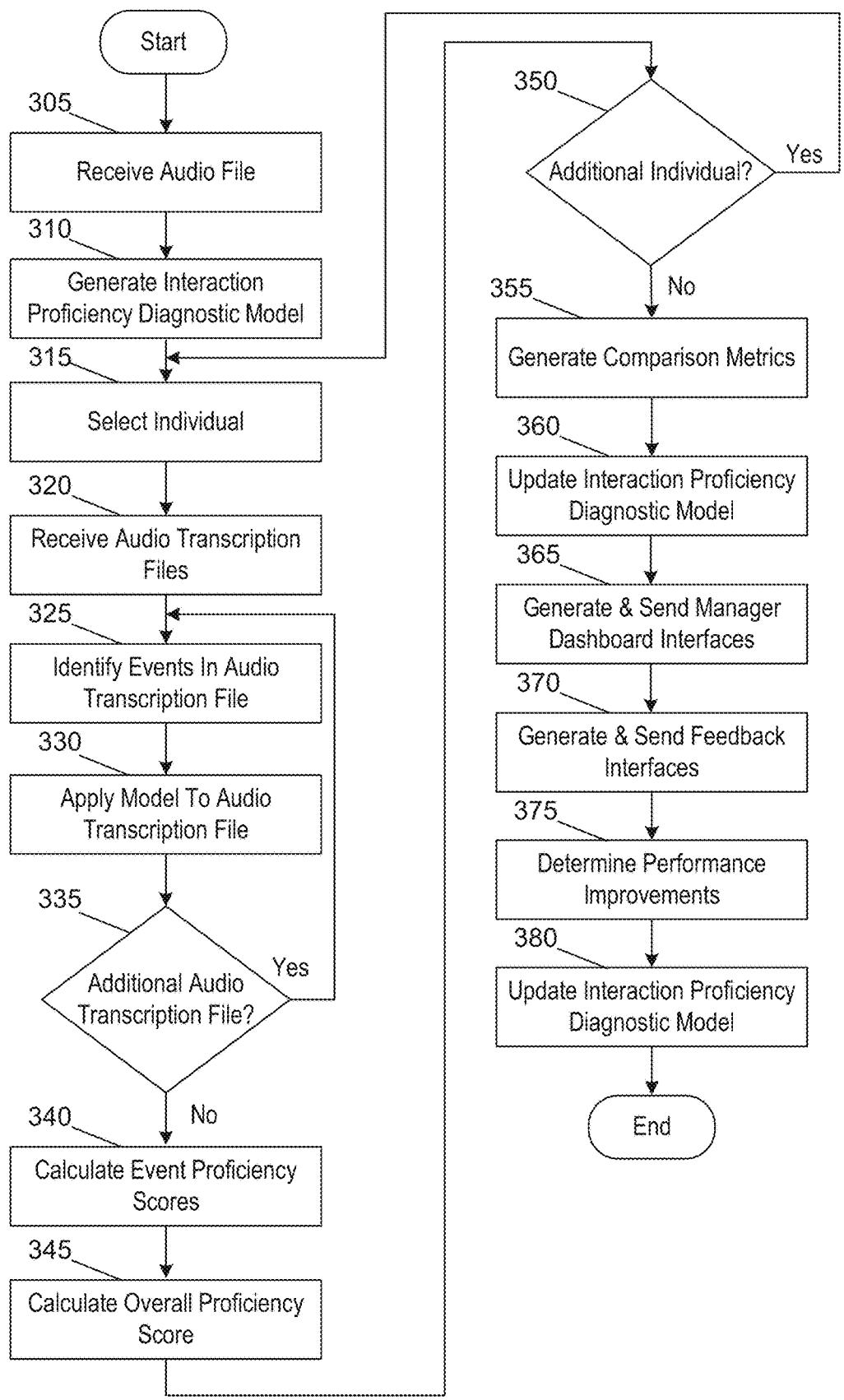
FIG. 3 depicts an illustrative method for automating training and performance evaluation using improved natural language processing techniques in accordance with one or more example arrangements discussed herein.

FIG. 3 depicts an illustrative method for automating training and performance evaluation using improved natural language processing techniques in accordance with one or more example embodiments. Referring to FIG. 3, at step 305, a computing platform having at least one processor, a communication interface, and memory may receive one or more audio files. The computing platform may generate an interaction proficiency diagnostic model using the one or more audio files received at step 310. At step 315, the computing platform may select an individual (e.g., an insurance agent). At step 320, the computing platform may receive audio transcription files associated with the selected individual. In some instances, the computing platform may receive a plurality of audio transcription files associated with a plurality of individuals, and may then select a first individual from the plurality. At step 325, the computing platform may select an audio transcription file associated with the selected individual and may identify events in the audio transcription file. At step 330, the computing platform may apply the interaction proficiency diagnostic model to the audio transcription file to identify scores and/or metrics associated with the audio transcription file. At step 335, the computing platform may determine whether an additional audio transcription file associated with the individual should be analyzed. If so, the computing platform may return to step 325 to select another audio transcription file. If not, the computing platform may proceed to step 340.

At step 340, the computing platform may calculate event proficiency scores for events identified in each of the audio transcription files. At step 345, the computing platform may calculate an overall proficiency score based on the event proficiency scores. At step 350, the computing platform may determine whether another individual should be analyzed. If so, the computing platform may return to step 315 to select another individual. If not, the computing platform may proceed to step 355.

At step 355, the computing platform may generate comparison metrics to compare performance of the various selected individuals. In some instances, the computing platform may generate the comparison metrics before calculating the overall proficiency score at step 345, and may use the comparison metrics to calculate the overall proficiency score. At step 360, the computing platform may update the interaction proficiency diagnostic model. At step 365, the computing platform may generate and send one or more manager dashboard interfaces to enterprise user devices associated with managers of the various selected individuals. At step 370, the computing platform may generate and send one or more feedback interfaces to enterprise user devices associated with the various selected individuals. At step 375, the computing platform may determine one or more performance improvements or deficiencies caused by the one or more feedback interfaces. At step 380, the computing platform may update the interaction proficiency diagnostic model based on the one or more performance improvements or deficiencies.

It should be understood that while the systems and methods described herein in the illustrative event sequence, system diagrams, and methods, are primarily described in the context of insurance sales, the systems and methods described herein may be applied to any number of other fields and applications to assist with performance evaluation, training, or the like based on natural language processing without departing from the scope of the disclosure. Accordingly, the outlined systems and methods may be applied to a wide variety of use cases beyond insurance sales and may be applied by any user/individual (e.g., not merely an insurance representative or manager). Furthermore, it should be understood that while the application primarily discusses calls, the systems and methods described herein may apply to any type of communication (e.g., video, audio, text, instant message or electronic communication) between any type of user (e.g., any call center, employee, or individual). It should also be understood that the methods described herein, such as the generation of feedback interfaces may, in some instances, occur in real time as a call is happening.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and memory storing computer-readable instructions that, when executed by the at least one processor, cause the computing platform to:
   determine, based on one or more of a plurality of audio transcription files, each associated with one of a plurality of individuals, a model for dynamic performance evaluation and training, wherein the model is a machine learning model that is dynamically updated as additional audio transcription files are received;
   receive an additional audio transcription file associated with a first individual of the plurality of individuals;
   analyze the additional audio transcription file using natural language processing and the machine learning model, wherein the analysis results in one or more proficiency scores for one or more events in the additional audio transcription file, wherein:
   the one or more events include at least one of: asking for a sale, making a multiline offering, handling a sales objection, or closing a sale,
   the one or more proficiency scores for the one or more events indicate a proportion of occurrences of the one or more events in audio transcription files for the first individual,
   the one or more proficiency scores for the one or more events is adjusted when a successful outcome is determined from the analysis of the additional audio transcription file, and
   one or more weights are assigned to the one or more proficiency scores for the one or more events, wherein a first weight of the one or more weights is assigned to a first event of the one or more events in a first geographic region and a second weight is assigned to the first event in a second geographic region, the first weight is greater than the second weight;
   calculate, based on the one or more proficiency scores and the one or more weights assigned to the one or more proficiency scores, an overall proficiency score;
   identify a learning style of the first individual based on the analysis using the natural language processing and the machine learning model;
   identify, based on the one or more proficiency scores, one or more areas for improvement associated with the first individual;
   determine, based on the one or more areas for improvement, performance feedback tailored to the first individual, wherein the performance feedback is based on the learning style of the first individual;
   generate, using the performance feedback tailored to the first individual, a feedback interface;
   send, to a user device associated with the first individual, the feedback interface; and
   dynamically modify the machine learning model for subsequent performance evaluation and training.

2. The computing platform of claim 1, wherein the memory stores additional computer-readable instructions that, when executed by the at least one processor, cause the computing platform to:
   receive, prior to calculating the overall proficiency score, a second plurality of audio transcription files corresponding to the first individual, wherein calculating the overall proficiency score comprises analyzing the second plurality of audio transcription files using natural language processing and the machine learning model, and wherein the one or more proficiency scores are based, at least in part, on the analysis of the second plurality of audio transcription files.

3. The computing platform of claim 2, wherein analyzing the additional audio transcription file and the second plurality of audio transcription files comprises analyzing one or more of: words spoken by the first individual, a total duration of silence, an average sentence length, or an amount of time the first individual spoke in comparison to a second individual.

4. The computing platform of claim 2, wherein the memory stores additional computer-readable instructions that, when executed by the at least one processor, cause the computing platform to:
   automatically analyze the one or more of the plurality of audio transcription files, wherein the analysis results in one or more additional proficiency scores, each corresponding to an event in the one or more of the plurality of audio transcription files; and
   compare the proficiency scores to the one or more additional proficiency scores.

5. The computing platform of claim 4, wherein the memory stores additional computer-readable instructions that, when executed by the at least one processor, cause the computing platform to:
   generate, using the one or more proficiency scores and the overall proficiency score, a manager dashboard interface; and
   send, to a user device associated with a manager of the first individual, the manager dashboard interface.

6. The computing platform of claim 5, wherein the memory stores additional computer-readable instructions that, when executed by the at least one processor, cause the computing platform to:
  generate one or more feedback interface commands and one or more manager dashboard interface commands;
  send, to the user device associated with the first individual, the one or more feedback interface commands, wherein sending the one or more feedback interface commands causes the user device associated with the first individual to display the feedback interface; and
  send, to the user device associated with the manager of the first individual, the one or more manager dashboard interface commands, wherein sending the one or more manager dashboard interface commands causes the user device associated with the manager of the first individual to display the manager dashboard interface.

7. The computing platform of claim 6, wherein the manager dashboard interface includes:
  for each of the first individual and the plurality of individuals, one or more of: a representative identifier, a close rate (CR), a linked quote percentage, a benchmark CR, and a comparison of the CR to the benchmark CR.

8. The computing platform of claim 7, wherein the benchmark CR indicates an average close rate of individuals who both:
  are located in a geographic area associated with the first individual, and
  are associated with a job title associated with the first individual.

9. The computing platform of claim 1, wherein the memory stores additional computer-readable instructions that, when executed by the at least one processor, cause the computing platform to:
  determine an impact on performance caused by the performance feedback tailored to the first individual; and
  dynamically modify, based on the impact on performance, the machine learning model for dynamic performance evaluation and training.

10. The computing platform of claim 1, wherein the feedback interface is generated in real time.

11. A method comprising:
  at a computing platform comprising at least one processor, a communication interface, and memory:
  determining, based on one or more of a plurality of audio transcription files, each associated with one of a plurality of individuals, a model for dynamic performance evaluation and training, wherein the model is a machine learning model that is dynamically updated as additional audio transcription files are received;
  receiving an additional audio transcription file associated with a first individual of the plurality of individuals;
  analyzing the additional audio transcription file using natural language processing and the machine learning model, wherein the analysis results in one or more proficiency scores for one or more events in the additional audio transcription file, wherein:
    the one or more events include at least one of: asking for a sale, making a multiline offering, handling a sales objection, or closing a sale,
    the one or more proficiency scores for the one or more events indicate a proportion of occurrences of the one or more events in audio transcription files for the first individual,
    the one or more proficiency scores for the one or more events is adjusted when a successful outcome is determined from the analysis of the additional audio transcription file, and
    one or more weights are assigned to the one or more proficiency scores for the one or more events, wherein a first weight of the one or more weights is assigned to a first event of the one or more events in a first geographic region and a second weight is assigned to the first event in a second geographic region, the first weight is greater than the second weight;
  identifying a learning style of the first individual based on the analysis using the natural language processing and the machine learning model;
  identifying, based on the one or more proficiency scores, one or more areas for improvement associated with the first individual;
  determining, based on the one or more proficiency scores, performance feedback tailored to the first individual, wherein the performance feedback is based on the learning style of the first individual;
  generating, using the performance feedback tailored to the first individual, a feedback interface;
  sending, to a user device associated with the first individual, the feedback interface; and
  dynamically modifying the machine learning model for subsequent performance evaluation and training.

12. The method of claim 11, further comprising:
  receiving a plurality of additional audio transcription files corresponding to the first individual,
  calculating, based on the one or more proficiency scores, an overall proficiency score based, at least in part, on analyzing the plurality of the additional audio transcription files using natural language processing and the machine learning model.

13. The method of claim 12, wherein:
  analyzing the additional audio transcription file and the plurality of additional audio transcription files comprises analyzing one or more of: words spoken by the first individual, a total duration of silence, an average sentence length, or an amount of time the first individual spoke in comparison to a second individual.

14. The method of claim 12, further comprising:
  automatically analyzing the one or more of the plurality of audio transcription files, wherein the analysis results in one or more additional proficiency scores, each corresponding to an event in the one or more of the plurality of audio transcription files; and
  comparing the proficiency scores to the one or more additional proficiency scores.

15. The method of claim 14, further comprising:
  generating, using the one or more proficiency scores and the overall proficiency score, a manager dashboard interface; and
  sending, to a user device associated with a manager of the first individual, the manager dashboard interface.

16. The method of claim 15, further comprising:
  generating one or more feedback interface commands and one or more manager dashboard interface commands;
  sending, to the user device associated with the first individual, the one or more feedback interface commands, wherein sending the one or more feedback interface commands causes the user device associated with the first individual to display the feedback interface; and sending, to the user device associated with the manager of the first individual, the one or more manager dashboard interface commands, wherein sending the one or more manager dashboard interface commands causes the user device associated with the manager of the first individual to display the manager dashboard interface.

17. The method of claim 16, wherein the manager dashboard interface includes:
for each of the first individual and the plurality of individuals, one or more of: a representative identifier, a close rate (CR), a linked quote percentage, a benchmark CR, and a comparison of the CR to the benchmark CR.

18. The method of claim 17, wherein the benchmark CR indicates an average close rate of individuals who both:
are located in a geographic area associated with the first individual, and
are associated with a job title associated with the first individual.

19. The method of claim 11, further comprising:
determining an impact on performance caused by the performance feedback tailored to the first individual; and
dynamically modifying, based on the impact on performance, the machine learning model for dynamic performance evaluation and training.

20. One or more non-transitory computer-readable media storing instructions that, when executed by a computing platform comprising at least one processor, a communication interface, and memory, cause the computing platform to:
determine, based on one or more of a plurality of audio transcription files, each associated with one of a plurality of individuals, a model for dynamic performance evaluation and training, wherein the model is a machine learning model that is dynamically updated as additional audio transcription files are received;
receive an additional audio transcription file associated with a first individual of the plurality of individuals;
analyze the additional audio transcription file using natural language processing and the machine learning model, wherein the analysis results in one or more proficiency scores for one or more events in the additional audio transcription file, wherein:
the one or more events include at least one of: asking for a sale, making a multiline offering, handling a sales objection, or closing a sale,
the one or more proficiency scores for the one or more events indicate a proportion of occurrences of the one or more events in audio transcription files for the first individual,
the one or more proficiency scores for the one or more events is adjusted when a successful outcome is determined from the analysis of the additional audio transcription file, and
one or more weights are assigned to the one or more proficiency scores for the one or more events, wherein a first weight of the one or more weights is assigned to a first event of the one or more events in a first geographic region and a second weight is assigned to the first event in a second geographic region, the first weight is greater than the second weight;
identify a learning style of the first individual based on the analysis using the natural language processing and the machine learning model;
determine, based on the one or more proficiency scores, performance feedback tailored to the first individual, wherein the performance feedback is based on the learning style of the first individual;
generate, using the performance feedback tailored to the first individual, a feedback interface;
send, to a user device associated with the first individual, the feedback interface;
determining an impact on performance caused by the performance feedback tailored to the first individual; and
dynamically modifying, based on the impact on performance, the machine learning model for dynamic performance evaluation and training.

* * * * *